(No Model.) 2 Sheets—Sheet 2.

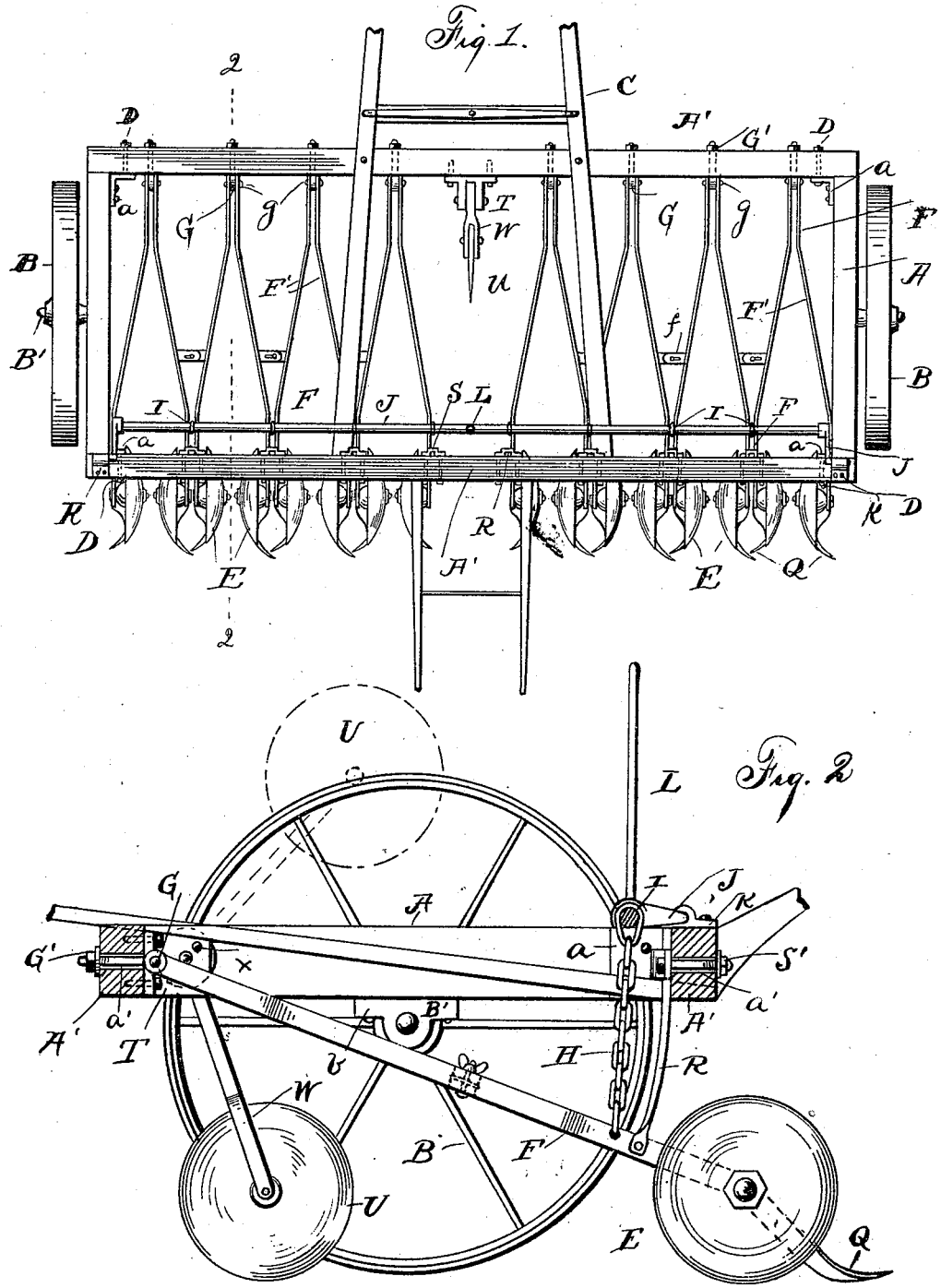

W. C. JOHNSON.
CULTIVATOR.

No. 512,708. Patented Jan. 16, 1894.

Witnesses.
E. Byron Gilchrist.
C. H. Dooly

Inventor.
William C. Johnson
B S Liggett and E W Liggett
his Attorneys

THE NATIONAL LITHOGRAPHING COMPANY,
WASHINGTON, D. C.

UNITED STATES PATENT OFFICE.

WILLIAM C. JOHNSON, OF CRESTON, OHIO.

CULTIVATOR.

SPECIFICATION forming part of Letters Patent No. 512,708, dated January 16, 1894.

Application filed March 10, 1892. Serial No. 424,414. (No model.)

*To all whom it may concern:*

Be it known that I, WILLIAM C. JOHNSON, of Creston, in the county of Wayne and State of Ohio, have invented certain new and useful Improvements in Cultivators; and I do hereby declare the following to be a full, clear, and exact description of the invention, such as will enable others skilled in the art to which it pertains to make and use the same.

My invention relates to improvements in cultivators, more especially adapted for cultivating garden crops, such, for instance, as onions; and it consists in certain features of construction, and in combination of parts, hereinafter described and pointed out in the claims.

Figure 5:
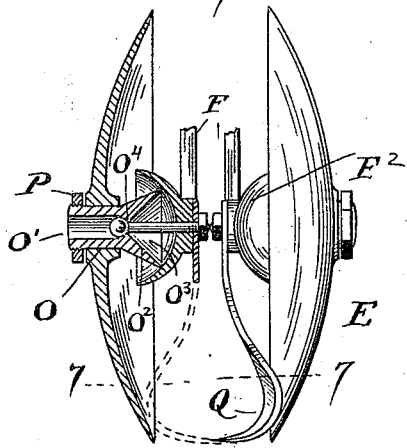
Figure 6:
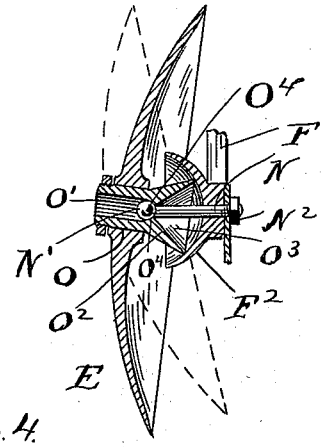
Figures 4, 7:
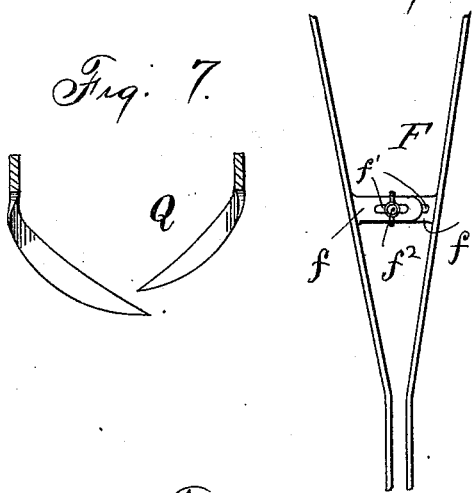
Figure 9:
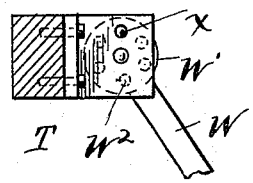
Figure 3:
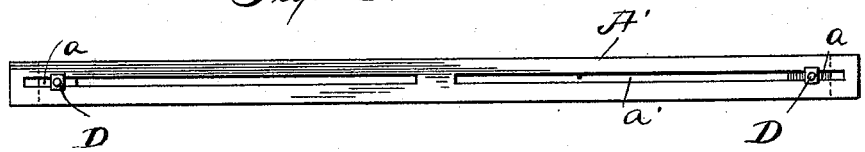
Figure 8:
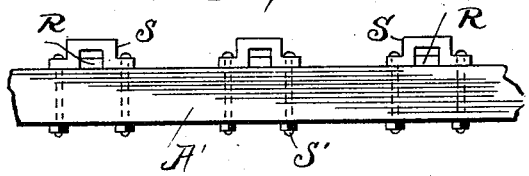

In the accompanying drawings, Figure 1 is a plan view of my improved cultivator. Fig. 2 is a side elevation in section on line 2—2, Fig. 1. Fig. 3 is a side elevation of the forward and rear transverse members of the frame-work of the machine. Fig. 4 is a plan in detail. Figs. 5 and 6 are elevations, partly in section, illustrating the cultivating-devices. Fig. 7 is plan of the cultivating-blades in section on line 7—7, Fig. 5. Figs. 8 and 9 more clearly exhibit certain details.

The frame-work of the machine comprises side-members A, and forward and rear transverse members A'.

B represents the main wheels that are mounted, in any suitable manner outside side-members A of the frame-work, on spindles, B', journaled in boxes $b$ secured to the under side of side-members of the supporting-frame.

C represents the shafts, between which the animal is hitched, said shafts being secured to forward and rear members A' of the frame-work as shown.

To enable the location of wheels B, at all times, between rows of plants, side-members A of the frame-work are adjustable endwise transverse members A'. A preferable construction is shown in Fig. 1, wherein side-members A, fit nicely between transverse members A', and have secured thereto, at either end, an angle-iron or strap, $a$, and members A' are slotted horizontally and longitudinally, as at $a'$, and shown more clearly in Fig. 3, for the passage of bolts, D, that are adapted to secure angle-irons or straps $a$ to the respective transverse members A' of the supporting-frame in the desired adjustment of wheels B relative to the rows of plants.

E represents cultivating-wheels or disks connected with the lower and rear end of a bar, F, bars F being secured to the forward member A' of the frame-work of the machine. Cultivator-wheels or disks E are arranged in pairs as shown in Fig. 1, the wheels of a pair being adapted to cultivate at opposite sides of a row of plants, a pair of cultivating-wheels or disks being located between a pair of bars F, the latter converging toward their forward end, as at F', and being pivotally connected, by means of a pin or bolt, $g$, with the eye of an eye-bolt G, bolts G extending through the respective longitudinal slot $a'$ in forward member A' of the frame-work, and being adapted to securely hold bars F in position. Upon loosening nuts G' of bolts G, the respective pairs of bars F and connected cultivating-wheels or disks E and attachments can be moved side-wise of the machine to accommodate the distance apart of the rows of plants. Adjacent bars of adjacent pairs of bars F, preferably somewhat rearward of the longitudinal center of the bars, have arms, as at $f$, projecting laterally toward and overlapping each other, as shown more clearly in Fig. 4, the respective arms $f$ being slotted longitudinally, as at $f'$, the slots of the respective arms registering with each other and being adapted to receive a bolt, as at $f^2$, to secure the arms together. By this construction, it will readily be understood that the respective bars F can be adjusted more or less apart to bring the cultivating-wheels or disks E closer or farther from the plants and cultivate accordingly, as desired. Arms $f$ not only perform the function just indicated, but also establish rigidity as between bars F and prevent independent lateral motion of bars F and connected cultivating-wheels or disks and attachments. The bar of a pair of bars F, whose lateral arm $f$ is overlapped by the lateral arm $f$ of the adjacent arm of the adjacent pair of bars F, has attached a chain, H, that is connected by means of a hook, ring, or loop, I, with a crank-shaft, J, the latter having bearing in boxes K secured to rear member A' of the frame-work of the machine.

L represents a lever for operating shaft J to raise or lower bars F and connected cultivating-wheels or disks and attachments as required, lever L being connected with the shaft in any suitable manner. Some suitable means should be provided for retaining lever L in the position desired, but as such means form no part of my invention and as there are a variety of well known devices well adapted for the purpose, it is not considered necessary to illustrate or describe the same.

An important feature of my invention consists in the construction and means for connecting cultivating-wheels or disks E with bars F, whereby said wheels or disks may be adjusted at different angles relative to the ground and crops to be tilled and cultivated, respectively, and thereby till accordingly. Referring to Figs. 5 and 6, that more clearly show the construction referred to, it will be observed that wheels or disks E are dish-shaped;—that is, concave on one side and convex on the other or opposite side, wheels or disks E being reversible upon their bearings, so as to bring either the convex or concave side of the wheels or disks next the row of plants, as required. Bars F, at their lower or rear end, terminate, respectively, in a laterally-projecting hollow and internally semi-spherical member, $F^2$, and O represents the bearing of wheels or disks E, bearing O being perforated longitudinally, as at $O'$, and preferably tubular, and extending into, and being enlarged inside of, internally semi-spherical member $F^2$ of the respective bar F, as at $O^2$, perforation $O'$ of member O being gradually enlarged in the enlarged end $O^2$ of member O, and preferably funnel-shaped, as at $O^3$, wheel or disk E being prevented from moving endwise on its bearing by means of the enlarged portion of bearing $O^2$ at one side, and a nut, P, mounted at the opposite side of wheel or disk E upon the correspondingly-threaded portion of the bearing. Disk or wheel E is connected to bar F by means of a rounded or spherical-headed bolt, N, the head of the latter, $N'$, being confined within bearing, O, outside the enlarged or internally-funnel-shaped end thereof, by means of one or more shoulders or projections, $O^4$, at the reduced end of the chamber of the enlarged portion $O^2$ of the bearing, the shank of bolt N extending through a lateral perforation in the respective bar F and having mounted thereon, at the opposite side of bar F, a nut, $N^2$. The internal surface of lateral member $F^2$ of bar F is sufficiently rough, so that as nut $N^2$ is tightened upon bolt N, and the edge of the enlarged end of bearing O tightly drawn up against and into frictional contact with the internal surface of member $F^2$ of bar F bearing O is held in its adjusted position by the frictional contact aforesaid. By means of the construction shown and just described it will be observed that a universal joint is had between wheel or disk E and bar F, and the wheel or disk can be adjusted at different angles, relative to the soil or crops as required, and secured in the required position by means of tightening nut $N^2$ aforesaid.

Q. represents cultivating-blades, one of the latter being secured to each bar preferably by means of the same bolt N that connects wheel or disk E with bar F. (See Fig. 5.) Blades Q and wheels or disks E are adapted to enter the ground to the same or approximately the same depth, blades Q being arranged oblique or at an obtuse angle with the soil to be tilled or cultivated by them (see Fig. 7) and extending rearward of wheel or disks E; and the blades of the pair of blades Q that are located between adjacent wheels or disks of adjacent pairs of wheels or disks, being arranged preferably the one somewhat in advance of, or shorter than the other, with an open space between the rear ends of the blades of a pair, whereby, in conjunction with the obliquity of the blades aforesaid, the escape or passage of stones, roots or other obstructions is accommodated. By the arrangement of cultivating-wheels or disks E and Q as hereinbefore described, there is no liability of tearing out the crops.

Although, as aforesaid, lateral arms $f$ of bars or members F prevent independent lateral motion of said bars, and connected cultivating-devices, arms $f$ are more especially designed to effect the adjustability of the cultivating-devices to till or cultivate more or less close to the plants. But to prevent any lateral motion of bars or members F and the connected cultivating-devices, either independently of each other, or collectively, I provide upright rods or bars, R, pivotally secured, at their lower ends, to bars F, rods or bars R, at their upper end, extending through straps, S, secured to rear member $A'$ of the frame-work of the machine by means of bolts, $S'$, that extend through the respective longitudinal slot $a'$ in rear member $A'$ aforesaid, thus accommodating the lateral adjustability of bars F and connected cultivating-devices. Straps S should embrace rods or bars R in such a manner that the latter will be free to move up and down and free to vibrate somewhat in the line of travel of the machine, but cannot move sidewise of the machine. (See Fig. 8.) A shield of some kind should also be provided for protecting the plants when the latter have acquired considerable growth, in order not to cut or injure the plants. Any of the well known appliances in the market may be employed for this purpose, and, therefore, it is not considered necessary to describe or illustrate the same.

Suitable means should also be provided for preventing any irregularity in the travel of the machine, such as would result from the horse swerving laterally out of the exact path. Referring to Figs. 1, 2 and 9, it will be observed that forward member $A'$ of the framework of the machine is provided with a pair of rearwardly-projecting lugs or ears, T, and U represents a wheel that is located centrally of the machine, preferably between members A' of the frame-work of the machine and somewhat forward of the center of the latter. This wheel is adapted to enter the ground any suitable distance and is suitably connected with the lower end of an arm, W, that, at its opposite or upper end, is circular or disk-shaped, as at W', and pivotally secured between and to rearwardly-projecting ears T aforesaid. Member W' of arm W is provided with a series of holes W², arranged in concentric order with the pivotal bearing of member W', said holes being adapted to register with a lateral hole in lugs T, a pin or bolt, X, adapted to enter said holes being provided for holding wheel U in an elevated or inoperative position, as shown in dotted lines, Fig. 2.

I would here remark that instead of having lateral member F² of bars F receive the enlarged end O² of bearing O, as hereinbefore described, the arrangement might be reversed so that the enlarged end of bearing O would receive the lateral member of bar F. The result, it is manifest, would be substantially the same, and I desire to have it understood that such and other modifications in the exact details of construction may be made without departing from the spirit and purpose of my invention.

What I claim is—

1. In a cultivator, side-members, A, and forward and rear transverse members, A', the latter being horizontally slotted, substantially as indicated, and members A having attached, at either end, angle-irons or straps, said side-members being adjustable endwise the transverse members, and bolts extending through the longitudinal slots of the transverse members and adapted to secure the angle-irons or straps aforesaid to the transverse members, in the desired adjustment of the side-members, substantially as and for the purpose set forth.

2. In a cultivator, the combination, with a transverse member of the frame-work of the machine, horizontally slotted, of a pair of cultivating-wheels or disks and a bar connected with each wheel or disk and connected with the transverse member of the frame-work aforesaid in which they are laterally adjustable, the bars of the pair of wheels or disks having lateral arms projecting toward and overlapping each other, said arms being longitudinally slotted, the slots of the respective arms registering with each other and a bolt extending through said slots and adapted to secure the cultivating-wheels or disks in the desired adjustment, substantially as and for the purpose set forth.

3. In a cultivator, the combination, with the frame-work of the machine, of cultivating-wheels or disks, and bars connecting said wheels or disks with the frame-work of the machine, the bearing of the wheels or disks being perforated longitudinally and terminating in an enlarged end having a correspondingly enlarged opening or chamber, the connecting bars aforesaid having a laterally-projecting hollow and internally semi-spherical member adapted to receive the enlarged end of the bearing of the respective cultivating-wheel or disk, a rounded or spherical headed-bolt or member connecting the bearing of the wheel or disk with the respective connecting bar and said bearing having one or more internal shoulders or projections adapted to hold the head of said connecting-bolt or member within the bearing, substantially as and for the purpose set forth.

4. In a cultivator, the combination, with the frame-work of the machine, of cultivating-wheels or disks, and bars connecting said wheels or disks with the frame-work of the machine, said wheels or disks being connected with the respective connecting-bars by means of a universal-joint whereby the cultivating-wheels or disks may be adjusted at different angles to the ground and crops to be tilled and cultivated, respectively, and suitable means for securing said wheels or disks in the desired angular adjustment, substantially as set forth.

5. In a cultivator, the combination, with the frame-work of the machine, of cultivating-wheels or disks, and bars connecting said wheels or disks with the frame-work of the machine, the bearing of the wheels or disks terminating in an enlarged chambered end, the connecting-bars aforesaid having a laterally-projecting hollow member, the latter and the enlarged end of the bearing of the cultivating-wheel or disk being adapted to be received the one by the other, a bolt or suitable device connecting the bearing of the wheel or disk with the respective connecting bar, the chambers, respectively, of the laterally-projecting hollow member of the connecting-bar and the enlarged end of the bearing of the wheel or disk, being of such size and shape as to accommodate the movement of the parts within said chambers, and suitable means for holding, in frictional contact, the enlarged end of the bearing of the cultivating-wheel or disk and the hollow lateral member of the connecting-bar aforesaid and secure the parts in the angular adjustment of the cultivating-wheel or disk, substantially as set forth.

6. In a cultivator, pairs of curved cultivating-wheels or disks adapted to cultivate the soil immediately adjacent the rows of plants, and a pair of cultivating-blades located and adapted to cultivate the soil between adjacent wheels or disks or adjacent pairs of cultivating-wheels or disks, substantially as set forth.

7. In a cultivator, pairs of cultivating-wheels or disks adapted to cultivate the soil immediately adjacent the rows of plants, and a pair of cultivating-blades located and adapted to cultivate the soil between adjacent wheels or disks of adjacent pairs of cultivating-wheels or disks, said cultivating blades being arranged oblique to the soil to be tilled or cultivated by them, and located, relative to each other, the rear end of the one blade somewhat in advance of the rear end of the other blade, substantially as and for the purpose set forth.

8. In a cultivator, the combination, with the frame-work of the machine, of a pair of cultivating-wheels or disks, and bars connecting said wheels or disks with the frame-work, a cultivating-blade located at either side of the pair of cultivating-wheels or disks and connected with the respective connecting-bar aforesaid said cultivating-wheels or disks, being adapted to cultivate the soil immediately adjacent the row of plants and adjustable at different angles to the soil or plants, to be cultivated, substantially as set forth.

In testimony whereof I sign this specification, in the presence of two witnesses, this 20th day of January, 1892.

WILLIAM C. JOHNSON.

Witnesses:
C. H. DORER,
WARD HOOVER.